Figure 1:
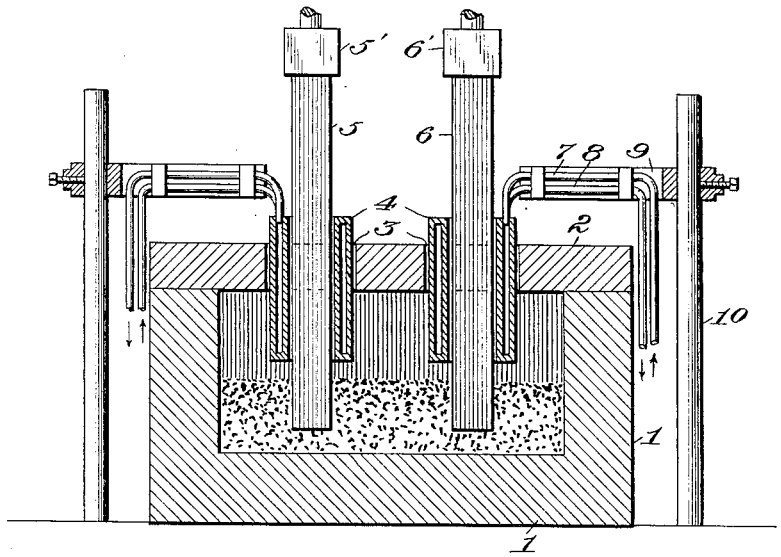

F. M. BECKET.
ELECTRIC FURNACE.
APPLICATION FILED JUNE 6, 1908.

932,368.

Patented Aug. 24, 1909.

Witnesses:
C. H. Potter.
M. E. Bruner.

Inventor,
Frederick M. Becket,
by Byrnes, Townsend, Buckenstein
Att'ys.

UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

ELECTRIC FURNACE.

932,368.  Specification of Letters Patent.  Patented Aug. 24, 1909.

Original application filed January 8, 1908, Serial No. 409,858. Divided and this application filed June 6, 1908. Serial No. 437,180.

*To all whom it may concern:*

Be it known that I, FREDERICK M. BECKET, a subject of the King of Great Britain, residing at Niagara Falls, in the county of Niagara and State of New York, have invented certain new and useful Improvements in Electric Furnaces, of which the following is a specification.

This invention relates to the production of alloys of the refractory metals, and the object of the invention is to provide a furnace by means of which such alloys, and more particularly the alloys of vanadium and tungsten, may be obtained with a low carbon content and with any desired proportion of iron or other alloying metal.

In its preferred form the invention comprises an electric furnace adapted to receive a charge containing an ore of a refractory metal and a reducing agent, one or all of the electrodes consisting of iron or of an iron-alloy, or other metal capable of alloying with the reduced product, provision being made for cooling the electrodes to regulate their consumption and the composition of the product, the cooling means being adjustable to regulate the cooling effect at the working end of the electrode.

It is well known that the refractory metals, as for example vanadium and tungsten, possess a high affinity for carbon, and that in the production of these metals or their alloys in an electric furnace having carbon or graphite electrodes a considerable proportion of carbon is absorbed by the metal or alloy, reducing its value and limiting its application in the arts. For the production of alloys of these metals having any desired proportion of iron in excess of the proportion existing in the ores, it has been usual to incorporate metallic iron or iron ores with the charge. I have discovered that the alloys of the refractory metals, particularly their alloys with iron, may be economically and commercially produced by smelting a suitable charge by means of an electric current carried by an electrode or electrodes of iron serving as a source of iron in the alloy, cooling means being applied to the electrodes to regulate their consumption and thereby to control the composition of the product. The composition of the product may also be controlled by adjustment of the current conditions and regulation of the temperature of the bath, or by the addition of iron or ores of iron or other alloying metal to the charge. The cooling of the electrodes may be accomplished by the use of cooling jackets such as are described in connection with carbon electrodes in my prior patent, No. 855,441, granted June 4, 1907; or any suitable cooling means may be used.

Figure 2:
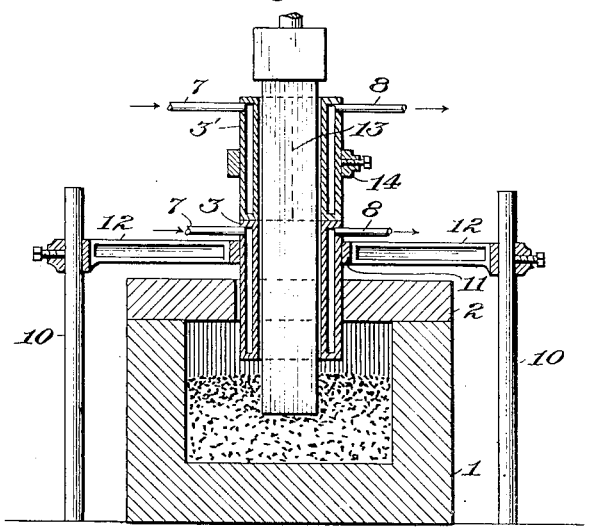

Suitable apparatus for carrying out the process is shown in the accompanying drawing, wherein:

Figure 1 is a vertical longitudinal section of a smelting furnace, showing two depending electrodes and their cooling jackets; and Fig. 2 is a vertical transverse section of a furnace showing an electrode provided with two superposed cooling jackets.

The furnace shown comprises a floor and sides 1 and a roof 2 which may be of firebrick. In the roof are two vertical openings 3 through which pass the cooling jackets 4, preferably of iron, which in turn receive the electrodes 5, 6, of opposite polarity, having terminals and supports 5', 6'. To the upper end of each jacket are connected pipes 7, 8, carried by a bracket 9 which is adjustably mounted on a vertical rod 10. The pipes 7, 8, serve both as a means for adjustably supporting the jackets 4 independently of the furnace-roof and electrodes and for the supply and discharge of water or other cooling medium.

Fig. 2 shows a modified construction in which the electrode is provided with two superposed cooling jackets 3, 3'. The lower jacket is clamped within a ring 11 which is carried by arms 12 adjustably supported at their outer ends upon vertical rods 10. The upper jacket is preferably split longitudinally on the line 13 and the two sections are clamped together by the ring 14.

The charge to be smelted may comprise an ore or concentrate containing a refractory metal, as for example an oxid ore of vanadium or tungsten, a concentrate therefrom, or an oxid prepared from such ore; sulfid ores of vanadium or oxygen-containing products prepared therefrom; and a suitable reducing agent, as carbon, silicon, ferro-silicon, silicon carbid or the like, an acid or basic flux being usually added in proportion to yield with the constituents of the particular ore a suitable slag. The current is preferably sufficient to completely fuse the charge, providing a molten conductor between the electrodes, into which fresh portions of the charge may be introduced and from beneath which the metallic product may be tapped from time to time. The electrodes being adjustable within the cooling jackets are fed forward to compensate for their consumption, and such consumption is regulated, as above stated, by varying the cooling effect, as for instance by adjusting the position of the jackets relative to the working end of the electrodes; or the consumption of the electrodes may also be controlled by varying the temperature of the bath by regulating the current conditions. By such operation it is found practicable to produce alloys of the refractory metals substantially free from carbon or having a low carbon content in accordance with the composition of the charge, the alloys containing any desired proportion of the alloying metal derived from the electrodes.

While I have described the invention as practiced by means of metallic electrodes of opposite polarity depending into the charge or molten bath, it will be understood that the electrodes may be otherwise disposed, and that if desired a single depending electrode may be used, or a group of such electrodes of common polarity, the current passing to the molten product constituting the electrode of opposite polarity.

This apparatus is a division of my prior patent No. 892,211, granted June 30, 1908.

I claim:—

1. In an electric furnace, a metallic electrode, and cooling-means therefor, said cooling means adjustable to regulate the cooling effect at the working end of the electrode.

2. In an electric furnace, a metallic electrode, supporting means therefor, and a cooling-jacket surrounding said electrode and longitudinally adjustable thereon.

3. An electric furnace comprising a working chamber, metallic electrodes of opposite polarity extending into the same, and cooling-jackets applied to said electrodes and longitudinally adjustable thereon.

In testimony whereof, I affix my signature in presence of two witnesses.

FREDERICK M. BECKET.

Witnesses:
 DEAN BURGESS,
 J. N. DEINHARDT.